(12) United States Patent
Momiyama et al.

(10) Patent No.: US 10,006,767 B2
(45) Date of Patent: Jun. 26, 2018

(54) AUTOMATIC LEVELING METHOD AND AUTOMATIC LEVELING DEVICE

(71) Applicant: Kabushiki Kaisha TOPCON, Tokyo-to (JP)

(72) Inventors: Homare Momiyama, Tokyo-to (JP); Satoshi Yanobe, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 197 days.

(21) Appl. No.: 15/071,535

(22) Filed: Mar. 16, 2016

(65) Prior Publication Data

US 2016/0290800 A1 Oct. 6, 2016

(30) Foreign Application Priority Data

Mar. 31, 2015 (JP) .................................. 2015-072625

(51) Int. Cl.
*G01C 9/06* (2006.01)
*G01C 25/00* (2006.01)

(52) U.S. Cl.
CPC ............... *G01C 9/06* (2013.01); *G01C 25/00* (2013.01)

(58) Field of Classification Search
CPC ... G01C 1/00; G01C 9/00; G01C 9/02; G01C 9/06; G01C 15/00; G01C 15/14; G01C 25/00; G01C 25/005
USPC ...................................................... 33/366.11
See application file for complete search history.

(56) References Cited

U.S. PATENT DOCUMENTS

| 6,313,912 | B1 | 11/2001 | Piske et al. |
| 8,857,069 | B2 * | 10/2014 | Adegawa ................. G01C 9/00 33/291 |
| 2011/0067250 | A1 | 3/2011 | Kludas et al. |

FOREIGN PATENT DOCUMENTS

| JP | 2-55113 U | 4/1990 |
| JP | 5-33014 U | 4/1993 |

OTHER PUBLICATIONS

European communication dated Aug. 23, 2016 in corresponding European patent application No. 16161454.0.

* cited by examiner

*Primary Examiner* — R. A. Smith
(74) *Attorney, Agent, or Firm* — Nields, Lemack & Frame, LLC

(57) ABSTRACT

The invention provides an automatic leveling device comprising; one tilt sensor provided on a leveling base plate, a leveling mechanism unit capable of tilting the leveling base plate in at least two directions and a control device for controlling the leveling mechanism unit and for tilting the leveling base plate, wherein the control device is configured to tilt the leveling base plate so that the tilting of the leveling base plate follows a searching route as set in a process of a leveling from a condition where a tilt detecting signal from the tilt sensor is not obtained, carries out an auxiliary leveling to obtain signals from the tilt sensor in a process of changing the tilting, and carries out a main leveling by controlling the leveling mechanism unit based on the detection result from the tilt sensor where a tilt detecting signal is obtained from the auxiliary leveling.

10 Claims, 3 Drawing Sheets

AUTOMATIC LEVELING METHOD AND AUTOMATIC LEVELING DEVICE

BACKGROUND OF THE INVENTION

The present invention relates to an automatic leveling method and an automatic leveling device, by which it is possible to perform a leveling on a tilt angle over a wide range with high accuracy by a simple structure.

In an apparatus, such as a surveying instrument, to which a leveling with high accuracy is required, a tilt sensor capable of detecting a horizontality with high accuracy is provided and the leveling is performed so that the apparatus becomes in horizontal position based on the signals from the tilt sensor.

However, in a tilt sensor with high accuracy, a detection range of the tilt angle is narrow and in a case where the tilt angle is large, a leveling cannot be performed. For this reason, in an automatic leveling device as used in the past, a high accuracy tilt sensor with highly accurate detection accuracy and a normal type tilt sensor which can detect a tilt angle in a wide range but with low accuracy are provided. In a case where the tilt angle exceeds the detection range of the high accuracy tilt sensor, a coarse leveling is performed based on detection results of the normal type tilt sensor, and further, a precise leveling is performed based on a detection result of the high accuracy tilt sensor.

For this reason, two types of tilt sensors with different accuracy are required, many components have been required, the structure becomes more complicated, and as a result, the manufacturing cost is increased.

SUMMARY OF THE INVENTION

It is an object of the present invention to provide an automatic leveling method and an automatic leveling device, by which it is possible to perform a highly accurate leveling by one tilt sensor and on a tilt angle over a wide range.

To attain the object as described above, an automatic leveling method according to the present invention is an automatic leveling method in an automatic leveling device having one tilt sensor provided on a leveling base plate, comprising an auxiliary leveling and a main leveling, wherein the auxiliary leveling is for changing a tilting of the leveling base plate and for obtaining a signal from the tilt sensor in a process of changing the tilting, and the main leveling is for leveling the leveling base plate horizontally based on the signal from the tilt sensor.

Further, in the automatic leveling method according to the present invention, the auxiliary leveling changes the tilting of the leveling base plate according to a driving limit as set to leave a predetermined surplus with respect to a maximum leveling range of the automatic leveling device.

Further, in the automatic leveling method according to the present invention, the automatic leveling device has a leveling result as obtained when the leveling base plate is leveled horizontally, as an absolute position, and the auxiliary leveling is started from the absolute position.

Further, the automatic leveling method according to the present invention, the leveling result is obtained every time an automatic leveling is executed, and the absolute position is updated based on the leveling result.

Further, an automatic leveling device according to the present invention comprises one tilt sensor provided on a leveling base plate, a leveling mechanism unit capable of tilting the leveling base plate in at least two directions and a control device for controlling the leveling mechanism unit and for tilting the leveling base plate in a condition as required, wherein the control device is configured so as to tilt the leveling base plate so that a change of the tilting of the leveling base plate follows a searching route as set in a process of a leveling from a condition where a tilt detecting signal from the tilt sensor is not obtained, carries out an auxiliary leveling to obtain signals from the tilt sensor in a process of changing the tilting, and carries out a main leveling by controlling the leveling mechanism unit based on the detection result from the tilt sensor in a case where a tilt detecting signal from the tilt sensor is obtained in a process of the auxiliary leveling.

Further, in the automatic leveling device according to the present invention, the control device carries out the auxiliary leveling in which the tilting of the leveling base plate is changed according to a driving limit as set to leave a predetermined surplus with respect to a maximum leveling range of the leveling mechanism unit and a signal from the tilt sensor is obtained in the process of changing the tilting.

Further, in the automatic leveling device according to the present invention, the control device stores leveling results as obtained, when the leveling base plate is leveled horizontally, as an absolute position, and the auxiliary leveling is started from the absolute position.

Further, in the automatic leveling device according to the present invention, the leveling mechanism unit comprises limit sensors for detecting a tilting limit and wherein the control device stores a position of the leveling base plate, when the limit sensors detect a tilting limit, as an absolute position, and the auxiliary leveling is started from the absolute position.

Furthermore, in the automatic leveling device according to the present invention, the control device obtains leveling results every time an automatic leveling is carried out and updates the absolute position based on the leveling results.

According to the present invention, an automatic leveling method is an automatic leveling method in an automatic leveling device having one tilt sensor provided on a leveling base plate, comprising an auxiliary leveling and a main leveling, wherein the auxiliary leveling is for changing a tilting of the leveling base plate and for obtaining a signal from the tilt sensor in a process of changing the tilting, and the main leveling is for leveling the leveling base plate horizontally based on the signal from the tilt sensor. As a result, an automatic leveling can be performed from a condition exceeding a detection range of the tilt sensor with a simple arrangement having only one tilt sensor.

Further, according to the present invention, in the automatic leveling method, the auxiliary leveling changes the tilting of the leveling base plate according to a driving limit as set to leave a predetermined surplus with respect to a maximum leveling range of the automatic leveling device. As a result, an auxiliary leveling can be performed according to the detection range of the tilt sensor.

Further, according to the present invention, in the automatic leveling method, the automatic leveling device has a leveling result as obtained when the leveling base plate is leveled horizontally, as an absolute position, and the auxiliary leveling is started from the absolute position. As a result, there is no need to set an absolute position at the starting of the auxiliary leveling and a leveling operation can be started immediately.

Further, according to the present invention, in the automatic leveling method, the leveling result is obtained every time an automatic leveling is executed, and the absolute position is updated based on the leveling result. As a result, there is no need to set an absolute position at the starting of the auxiliary leveling and a leveling operation can be started immediately from the previous leveling condition.

Further, according to the present invention, an automatic leveling device comprises one tilt sensor provided on a leveling base plate, a leveling mechanism unit capable of tilting the leveling base plate in at least two directions and a control device for controlling the leveling mechanism unit and for tilting the leveling base plate in a condition as required, wherein the control device is configured so as to tilt the leveling base plate so that a change of the tilting of the leveling base plate follows a searching route as set in a process of a leveling from a condition where a tilt detecting signal from the tilt sensor is not obtained, carries out an auxiliary leveling to obtain signals from the tilt sensor in a process of changing the tilting, and carries out a main leveling by controlling the leveling mechanism unit based on the detection result from the tilt sensor in a case where a tilt detecting signal from the tilt sensor is obtained in a process of the auxiliary leveling. As a result, an automatic leveling can be performed from a condition exceeding a detection range of the tilt sensor with a simple arrangement having only one tilt sensor.

Further, according to the present invention, in the automatic leveling device, the control device carries out the auxiliary leveling in which the tilting of the leveling base plate is changed according to a driving limit as set to leave a predetermined surplus with respect to a maximum leveling range of the leveling mechanism unit and a signal from the tilt sensor is obtained in the process of changing the tilting. As a result, an auxiliary leveling can be performed according to the detection range of the tilt sensor.

Further, according to the present invention, in the automatic leveling device, the control device stores leveling results as obtained, when the leveling base plate is leveled horizontally, as an absolute position, and the auxiliary leveling is started from the absolute position. As a result, there is no need to set an absolute position at the starting of the auxiliary leveling and a leveling operation can be started immediately.

Further, according to the present invention, in the automatic leveling device, the leveling mechanism unit comprises limit sensors for detecting a tilting limit and wherein the control device stores a position of the leveling base plate, when the limit sensors detect a tilting limit, as an absolute position, and the auxiliary leveling is started from the absolute position. As a result, there is no need to set an absolute position at the starting of the auxiliary leveling and a leveling operation can be started immediately.

Furthermore, according to the present invention, in the automatic leveling device, the control device obtains leveling results every time an automatic leveling is carried out and updates the absolute position based on the leveling results. As a result, there is no need to set an absolute position at the starting of the auxiliary leveling and a leveling operation can be started immediately from the previous leveling condition.

DETAILED DESCRIPTION OF THE PREFERRED EMBODIMENT

A description will be given below on an embodiment of the present invention by referring to the attached drawings.

Figure 1:
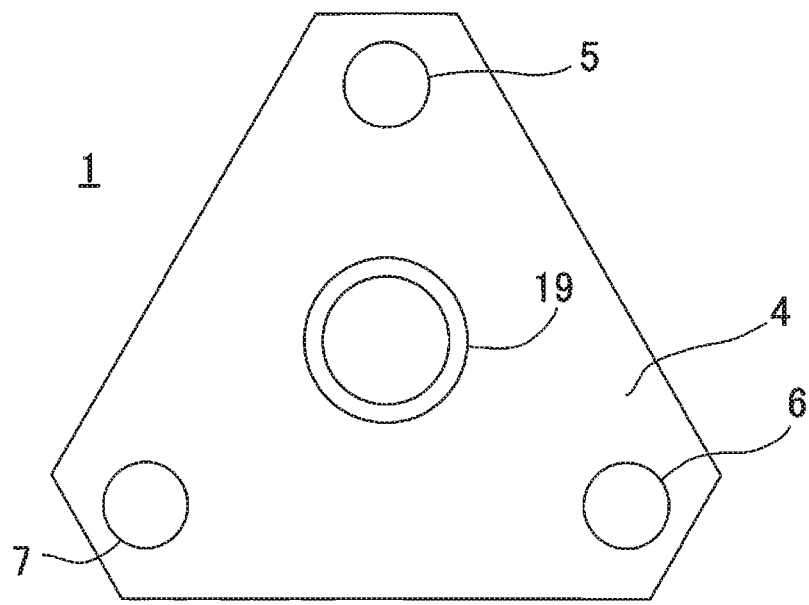
FIG. 1 is a plan view of an automatic leveling device according to an embodiment of the present invention.
Figure 2:
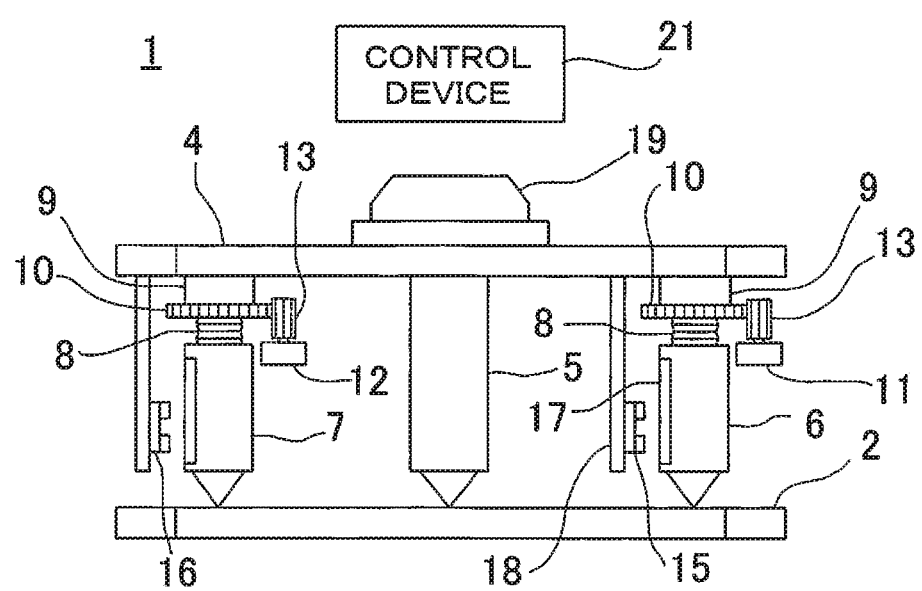
FIG. 2 is a front view of the automatic leveling device.

FIG. 1 and FIG. 2 show an automatic leveling device according to the embodiment of the present invention.

In FIG. 1 and FIG. 2, reference numeral 1 denotes an automatic leveling device and reference numeral 2 denotes a part where the automatic leveling device 1 is placed, a seat plate, for instance. Further, reference numeral 4 denotes a leveling base plate, reference numeral 5 denotes a fixed shaft, reference numeral 6 denotes a right driving shaft and reference numeral 7 denotes a left driving shaft. Further, a device or a machine such as a measuring instrument and the like, for which a leveling is required, is mounted on the leveling base plate 4.

The fixed shaft 5, the right driving shaft 6 and the left driving shaft 7 are extended downwards in a vertical direction with respect to the leveling base plate 4 and each lower end portion is designed as a tip in a conical shape respectively. The fixed shaft 5 is fixedly provided, the right driving shaft 6 and the left driving shaft 7 are restrained in rotary movement and are slidably provided in an axial direction respectively.

An upper end portion of each of the right driving shaft 6 and the left driving shaft 7 is designed as a screw portion 8 and a nut piece 9 is screwed into the screw portion 8. A leveling gear 10 is provided on the nut piece 9 and the leveling gear 10 and the nut piece 9 are designed so as to rotate integrally.

A right leveling motor 11 is provided with respect to the right driving shaft 6, a left leveling motor 12 is provided with respect to the left driving shaft 7, and on an output shaft of each of the right leveling motor 11 and the left leveling motor 12, a driving gear 13 is fitted and fixed respectively. The driving gear 13 is engaged with the leveling gear 10, and by a driving of the right leveling motor 11, the nut piece 9 is rotated via the driving gear 13 and the leveling gear 10 and the screw portion 8 is displaced in an up-and-down direction with respect to the leveling base plate 4 (hereinafter, referred as a "screwing action"). That is, the right driving shaft 6 is displaced in an up-and-down direction in response to normal or reverse rotation of the nut piece 9.

Alternatively, by a driving of the left leveling motor 12, the nut piece 9 is rotated via the driving gear 13 and the leveling gear 10 and the left driving shaft 7 is displaced in an up-and-down direction with respect to the leveling base plate 4 by the screwing action between the nut piece 9 and the screw portion 8.

By driving the right leveling motor 11 and the left leveling motor 12 individually, the right driving shaft 6 and the left driving shaft 7 are displaced in an up-and-down direction independently from each other. By controlling a displacement of the right driving shaft 6 and the left driving shaft 7, the leveling base plate 4 can adjust a tilting in two directions with the fixed shaft 5 as a center.

Here, the screw portion 8, the nut piece 9, the right leveling motor 11, the left leveling motor 12, the driving gear 13 and the like make up together a leveling mechanism unit capable of tilting the leveling base plate 4 in two directions.

A right limit sensor 15 and a left limit sensor 16 are provided with respect to the right driving shaft 6 and the left driving shaft 7 respectively. Since both the limit sensors 15 and 16 are the same, a description will be given below on the right limit sensor 15 as provided with respect to the right driving shaft 6.

The right limit sensor 15 is for detecting a limit of the displacement of the right driving shaft 6. Various types of limit sensors can be used as the right limit sensor 15.

For instance, an optical sensor is used as a right limit sensor 15 (hereinafter, a description will be given by referring to the right limit sensor 15 as an optical sensor). As shown in the figure, a non-reflecting part 17 is provided on a surface of the right driving shaft 6. The non-reflecting part 17 has a known length in an axial direction of the right driving shaft 6, i.e. in a vertical direction.

A supporting member 18 is disposed in opposite to the non-reflecting part 17 and the right limit sensor 15 is provided on the supporting member 18. The right limit sensor 15 is composed of a light projector and a photodetector, and a detection light is projected from the light projector and the photodetector is configured to detect whether there is a reflected light or not. Therefore, at a position where the right limit sensor 15 stands face to face with the non-reflecting part 17, a reflected light is not detected and a position where the photodetector detects the reflected light is a limit position.

When the right leveling motor 11 is driven and the right driving shaft 6 is extended, the right limit sensor 15 detects an upper end of the non-reflecting part 17 and the driving of the right leveling motor 11 is stopped based on a detection of the right limit sensor 15. Further, when the right leveling motor 11 is driven and the right driving shaft 6 is retracted, the right limit sensor 15 detects a lower end of the non-reflecting part 17 and the driving of the right leveling motor 11 is stopped based on the detection of the right limit sensor 15.

Further, if a motor capable of detecting an amount of rotation is used as the right leveling motor 11 and the left leveling motor 12, or a driving system is adopted, which can control the amount of rotation, a displacement amount of the right driving shaft 6 with respect to the right limit sensor 15 can be monitored by using an upper end or a lower end of the non-reflecting part 17 as a reference.

As the right leveling motor 11 and the left leveling motor 12, a pulse motor or a motor with an encoder or the like is used.

Next, a limit sensor is not limited to an optical type. For instance, as other example of the limit sensor, a proximity sensor using a magnetism is employed. In the proximity sensor, a magnet is provided on either one of the right driving shaft 6 or the supporting member 18 and a magnetometric detector is provided on the other.

Alternatively, a contact type sensor is used. As the contact type sensor, an electrode is provided on the supporting member 18, the electrode comes into contact with the right driving shaft 6, a contact position is changed due to the displacement of the right driving shaft 6, and the limit position is detected from an electrifying condition between the electrode and the right driving shaft 6.

Further, as the right limit sensor 15, a limit sensor, which can detect the position between the right driving shaft 6 and the right limit sensor 15, would suffice, so various types of sensors can be applied.

A tilt sensor 19 is provided at the center of an upper surface of the leveling base plate 4. The tilt sensor 19 can detect a tilting in two horizontal directions (e.g. in an X-axis direction and a Y-axis direction) within a range of ±10 to ±2° with high accuracy.

The right leveling motor 11, the left leveling motor 12 and the tilt sensor 19 are electrically connected to a control device 21, the control device 21 drives the right leveling motor 11 and the left leveling motor 12 based on the detection result of the tilt sensor 19 and an automatic leveling is performed so that the leveling base plate 4 will be in horizontal position.

Figure 3:
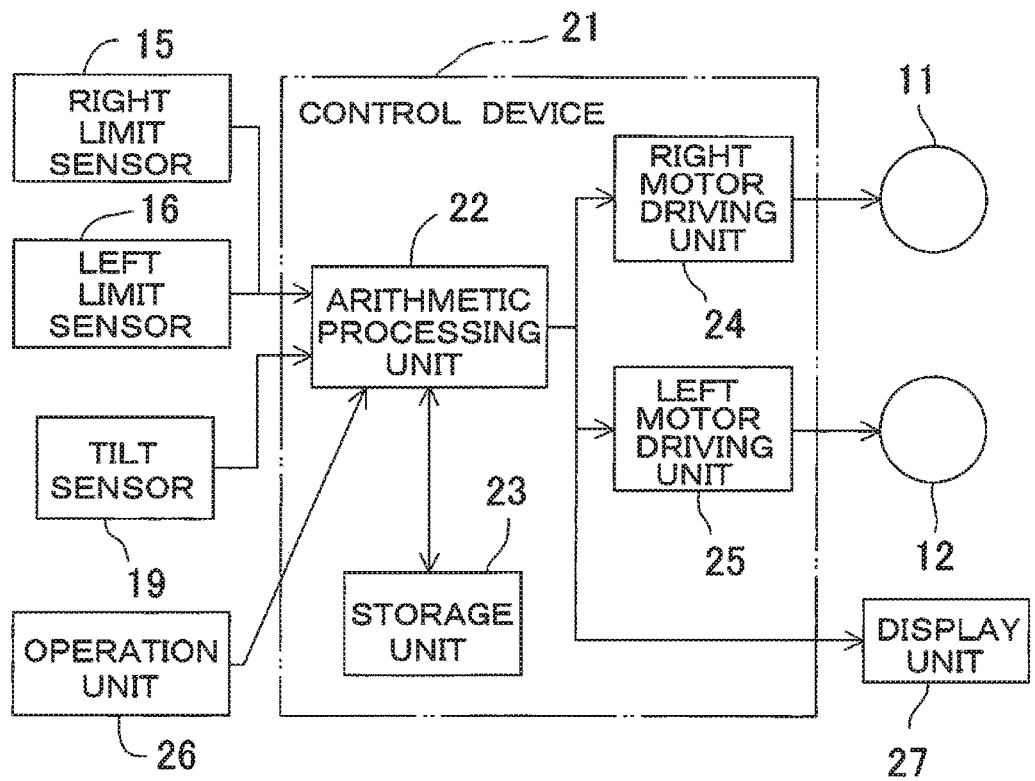
FIG. 3 is a block diagram to show a control device of the automatic leveling device.

By referring to FIG. 3, a description will be given on the schematics of the control device 21.

The control device 21 has an arithmetic processing unit (e.g. a CPU) 22, a storage unit 23, a right motor driving unit 24 and a left motor driving unit 25. Further, an operation unit 26 for starting the leveling operation and a display unit 27 for displaying the leveling condition, the leveling results and the like are connected to the control device 21.

Here, as the leveling condition, a condition of a progress of a leveling and a completion of a leveling and the like are exemplified. The leveling result indicates informations in which a correction of a tilting of the leveling base plate 4 such as how much the leveling base plate 4 is tilted in the X-axis direction and the Y-axis direction respectively, or in which direction and how much the right leveling motor 11 and the left leveling motor 12 are rotated by executing the leveling.

In the storage unit 23, various types of programs are stored. These programs include, for instance: a sequence program for making the right leveling motor 11 and the left leveling motor 12 perform the leveling operation via the right motor driving unit 24 and the left motor driving unit 25, a leveling program for calculating a tilt angle and a tilting direction based on detection results of the right limit sensor 15, the left limit sensor 16 and the tilt sensor 19, for calculating the amount of driving and the like of the right leveling motor 11 and the left leveling motor 12 and for controlling the drivings of the right motor driving unit 24 and the left motor driving unit 25, and the like. Further, a leveling result is stored in the storage unit 23 and the leveling result is updated to a newest leveling result every time the automatic leveling is executed.

Figure 4:
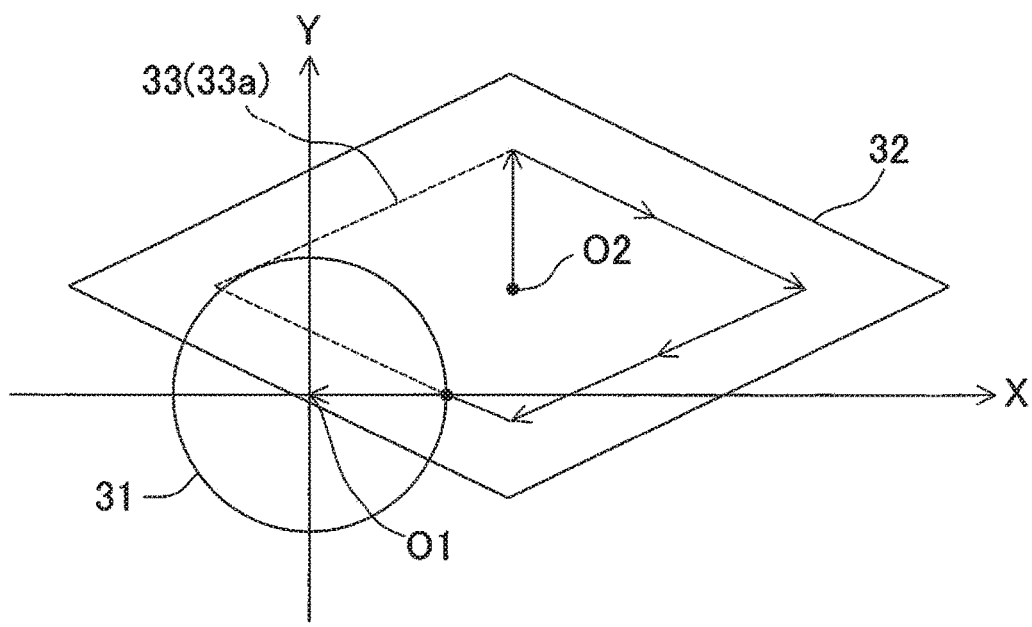
FIG. 4 is an explanatory drawing to show a relation between a leveling operation and a detection range of a tilt sensor of the present embodiment.

In FIG. 4, a description will be given on an automatic leveling method by the automatic leveling device 1.

In FIG. 4, a coordinate system as indicated by an X-axis and a Y-axis shows a tilting direction and a tilt angle of the leveling base plate 4. An intersection (an origin point) O1 of the X-axis and the Y-axis indicates that tilt angles in the X-axis direction and the Y-axis direction are both zero, i.e. a horizontal condition.

When referred to FIG. 1, the leveling base plate 4 is supported at three points, i.e. a lower end of the fixed shaft 5, a lower end of the right driving shaft 6 and a lower end of the left driving shaft 7. Thus, a triangle is formed which has a center of the fixed shaft 5 as a vertex. In FIG. 1, a line segment connecting a center of the right driving shaft 6 and a center of the left driving shaft 7 as a base line, a line segment connecting the center of the fixed shaft 5 and the center of the right driving shaft 6 as a right oblique line and a line segment connecting the center of the fixed shaft 5 and the center of the left driving shaft 7 as a left oblique line, constitute an isosceles triangle.

Further, when FIG. 1 and FIG. 4 are compared with each other, the base line runs in parallel to the X-axis and a perpendicular bisector of the base line (a line passing through the center of the fixed axis 5) coincides with the Y-axis.

In the leveling base plate 4, since the fixed shaft 5 is fixed and the right driving shaft 6 and the level driving shaft 7 are displaced in a vertical direction, the leveling base plate 4 is tilted in two directions of X and Y with the fixed shaft 5 as the center.

For instance, when the right driving shaft 6 is extended by Δ extension and the left driving shaft 7 is retracted by Δ retracting by the same amount, the leveling base plate 4 is tilted in the X-axis direction with the Y-axis as the center. In this case, there is no change in the tilting of the Y-axis direction.

Further, when the right driving shaft 6 and the left driving shaft 7 are retracted or extended by the same amount by Δ retracting or extension, the leveling base plate 4 is tilted in the Y-axis direction with the lower end of the fixed shaft 5 as the center. In this case, there is no change in the tilting of the X-axis direction. Thus, by controlling the displacement amount of the right driving shaft 6 and the left driving shaft 7, it is possible to tilt the leveling base plate 4 in an arbitrary direction of the X-axis or the Y-axis by an arbitrary tilting amount.

Further, in FIG. 4, a circle with the origin point O1 as the center shows a range where the tilt sensor 19 can detect a tilting (a sensor detection range 31), and a rhomboid given in continuous line shows a limit (a displacement limit 32) where the leveling base plate 4 can tilt by displacing the right driving shaft 6 and the left driving shaft 7.

In the figure, the displacement limit 32 is given as a rhomboid, which is flat in the Y-axis direction, because regarding the tilting in the X-axis direction, by extending the right driving shaft 6 at the maximum and by retracting the left driving shaft 7 at the maximum, thereby obtaining the amount of change where the displacement amount of the right driving shaft 6 and the displacement amount of the left driving shaft 7 are added and because on the other hand, regarding the tilting in the Y-axis direction, in a case where the right driving shaft 6 and the left driving shaft 7 are displaced in the same direction at the maximum, thereby obtaining the maximum tilt angle.

It is to be noted that the actual driving amount of each of the right driving shaft 6 and the left driving shaft 7 is set up as a rhomboid as given by a broken line by leaving a predetermined surplus, as a driving limit 33. As to be described later, the surplus is set by taking the size and the like of the sensor detection range 31 into consideration.

A center O2 of the rhomboid indicates initial state of the automatic leveling device 1. The initial state is set as a condition where the leveling is performed on a horizontal plane at the time of shipment from a factory. Therefore, if it is supposed that the automatic leveling device 1 is installed on a horizontal plane, the origin point O1 coincides with the center O2.

In the initial state, positions in an axial direction of the right driving shaft 6 and the left driving shaft 7 are set up with the points as a reference where an upper end or a lower end of the non-reflecting part 17 is detected by the right limit sensor 15 and the left limit sensor 16.

A condition of FIG. 4 shows that the automatic leveling device 1 is installed on a tilted plane, shows that the automatic leveling device 1 is tilted in a + direction of the X-axis and in a + direction of the Y-axis respectively, and further, shows that the automatic leveling device 1 is tilted exceeding the range of a tilting detection of the tilt sensor 19. It is to be noted that if the center O2 is within the range of the sensor detection range 31, the automatic leveling can be executed based on the detection results of the tilt sensor 19.

In the present embodiment, since there is only one tilt sensor, i.e. the tilt sensor 19, in a case where a tilting of the automatic leveling device 1 under a non-leveling condition exceeds the detection range of the tilt sensor 19, it is necessary to level the tilting of the leveling base plate 4 up to a detectable tilt by the tilt sensor 19 (hereinafter, referred as an "auxiliary leveling").

The automatic leveling in the present embodiment includes an auxiliary leveling and a main leveling.

First, a description will be given below on the auxiliary leveling by referring to FIG. 4.

In the auxiliary leveling, the sensor detection range 31 is searched. In the searching, a searching route is set in advance. Although the setting of the searching route is arbitrary, as one example of the searching route as set, there is a rhomboid (hereinafter, this rhomboid is regarded as a searching route 33a) as shown by the driving limit 33.

Further, in a process to perform the leveling so as to pass through the searching route 33a, the searching route 33a (the driving limit 33) is set so that the tilting of the leveling base plate 4 is included in the sensor detection range 31.

Next, when the auxiliary leveling is started, first, the leveling base plate 4 is tilted to a tilting condition as shown by the points as required on the searching route 33a. Then, the right leveling motor 11 and the left leveling motor 12 are driven so that the tilting is changed along the searching route 33a. That is, the leveling base plate 4 is tilted first so as to coincide with the searching route 33a.

Here, in order to coincide with the searching route 33a, it is necessary to obtain a leveling direction (a tilting direction of the leveling base plate 4) and a leveling amount (a tilting amount of the leveling base plate 4). For this reason, it is necessary to know a posture of the leveling base plate 4 at the time of the starting of the auxiliary leveling, that is, a position (an absolute position) of the leveling base plate 4 with respect to the automatic leveling device 1.

Under the condition where the automatic leveling device 1 is installed on a horizontal plane and the leveling base plate 4 is leveled up at horizontal position, it is supposed that the leveling base plate 4 is at a reference position with respect to the automatic leveling device 1. Further, this reference position is shown by the center O2 in FIG. 4.

In order to obtain absolute position of the leveling base plate 4, the absolute position at the time of the leveling immediately before is stored in the storage unit 23. This absolute position is specified by a rotating position of the right motor driving unit 24 and by a rotating position of the left motor driving unit 25.

In case where the leveling is performed next, the absolute position as stored in the storage unit 23 will be a position where the auxiliary leveling is started.

It is to be noted that in the description as given above, although an absolute position is obtained with the horizontality as a reference, it may be so arranged that the position of the limit as detected by the right limit sensor 15 and the left limit sensor 16 is regarded as a reference, and the absolute position may be obtained. In this case also, the absolute position is stored in the storage unit 23 and the absolute position as stored will be a position where the auxiliary leveling is started.

In a case where the reference position is the center O2 at the time of the starting of the auxiliary leveling, the right leveling motor 11 and the left leveling motor 12 are driven so that the tilting of the leveling base plate 4 reaches the searching route 33a with the center O2 as a search starting point. It is to be noted that as to which of the right leveling motor 11 or the left leveling motor 12 is to be driven first or as to what order the driving is performed or the like, the sequence program is programmed so as to reach the searching route 33a via the shortest route.

In an example as shown in FIG. 4, the right leveling motor 11 and the left leveling motor 12 are driven in the same direction at a maximum amount and the right driving shaft 6 and the left driving shaft 7 are displaced in the same direction with a same amount, and the tilting is arranged so as to reach the searching route 33a. The tilting becomes a maximum tilt angle in the Y-axis direction. Then, the right driving shaft 6 is retracted by the right leveling motor 11 so that the tilting of the leveling base plate 4 changes along the line of the searching route 33a. With the increase of the X-axis tilt angle, the Y-axis tilt angle is decreased and reaches a maximum of an X-axis tilt angle of the driving limit 33. The left leveling motor 12 is driven and the left driving shaft 7 is retracted.

While the X-axis tilt angle is decreased, the Y-axis tilt angle is decreased and reaches a minimum of a Y-axis tilt angle.

Next, when the right driving shaft 6 is extended, while the X-axis tilt angle is decreased, the Y-axis tilt angle is increased and reaches a minimum of the X-axis tilt angle. When the left driving shaft 7 is extended, while the X-axis tilt angle is increased, the Y-axis tilt angle is increased, and the Y-axis tilt angle returns to the maximum of the Y-axis tilt angle. In this way, by tilting the leveling base plate 4, the tilting of the leveling base plate 4 is changed within the maximum leveling range which the automatic leveling device 1 has.

When a signal from the tilt sensor 19 can be obtained in a process where the leveling base plate 4 is being tilted so that the tilt angle of the leveling base plate 4 changes along the line of the searching route 33a, that is, when the tilting direction and the tilting amount of the leveling base plate 4 are within the range of the sensor detection range 31, the leveling is shifted from the auxiliary leveling to automatic leveling (the main leveling) based on the signal from the tilt sensor 19.

In this case, in order to shift to the main leveling and complete the leveling accurately based on the signal of the tilt sensor 19, it is required that the origin point O1 is within the range of the displacement limit 32. Even when the signal from the tilt sensor 19 is obtained, in a case where the origin point O1 is outside of the displacement limit 32, it becomes necessary to install the automatic leveling device 1 again. Therefore, the surplus between the displacement limit 32 and the searching route 33a, taking the sensor detection range 31 and the like into consideration, is set so that the origin point O1 exists within the displacement limit 32 under a condition where the signal of the tilt sensor 19 is detected.

When the automatic leveling based on the detecting signal of the tilt sensor 19 has been completed, the leveling results are stored in the storage unit 23. It is to be noted that as the leveling results, a rotating position of the right motor driving unit 24, a rotating position of the left motor driving unit 25, or positions in a vertical direction of the right driving shaft 6 and the left driving shaft 7 are included. The positions of the right driving shaft 6 and the left driving shaft 7 after the leveling are stored in the storage unit 23.

The leveling results as stored are used as an absolute position (an initial value) at the time of the starting of the auxiliary leveling in a case where next the automatic leveling device 1 is installed and the leveling is performed. The absolute position is updated based on the leveling results, the condition of the automatic leveling device 1 after the leveling is stored. As a result, there is no need to set the automatic leveling device 1 again to a reference condition each time in order to start the leveling and the leveling operation can be started immediately from the condition as used previously.

It is to be noted that there is a case where errors are accumulated in the absolute position as the leveling is repeatedly performed. In this case, the errors are corrected by a method as given below.

The absolute position of the leveling base plate 4 is stored at the time when limits are detected by the right limit sensor 15 and the left limit sensor 16. At a timing as required, an operator or a program drives the right leveling motor 11 and the left leveling motor 12, makes the right limit sensor 15 and the left limit sensor 16 detect the displacement limit 32 (an upper end or a lower end of the non-reflecting part 17 are detected). The absolute position is obtained from rotating positions of the right leveling motor 11 and the left leveling motor 12 at the time when the displacement limit 32 is detected, compares the absolute position as obtained and the absolute position as stored, and if there is an error, it is reset automatically or by the operator so that this error becomes 0.

Thus, by executing the auxiliary leveling before the main leveling is executed, it becomes possible to perform the automatic leveling over a wide range which exceeds the detection range of the tilt sensor by only one highly accurate tilt sensor.

Figure 5:
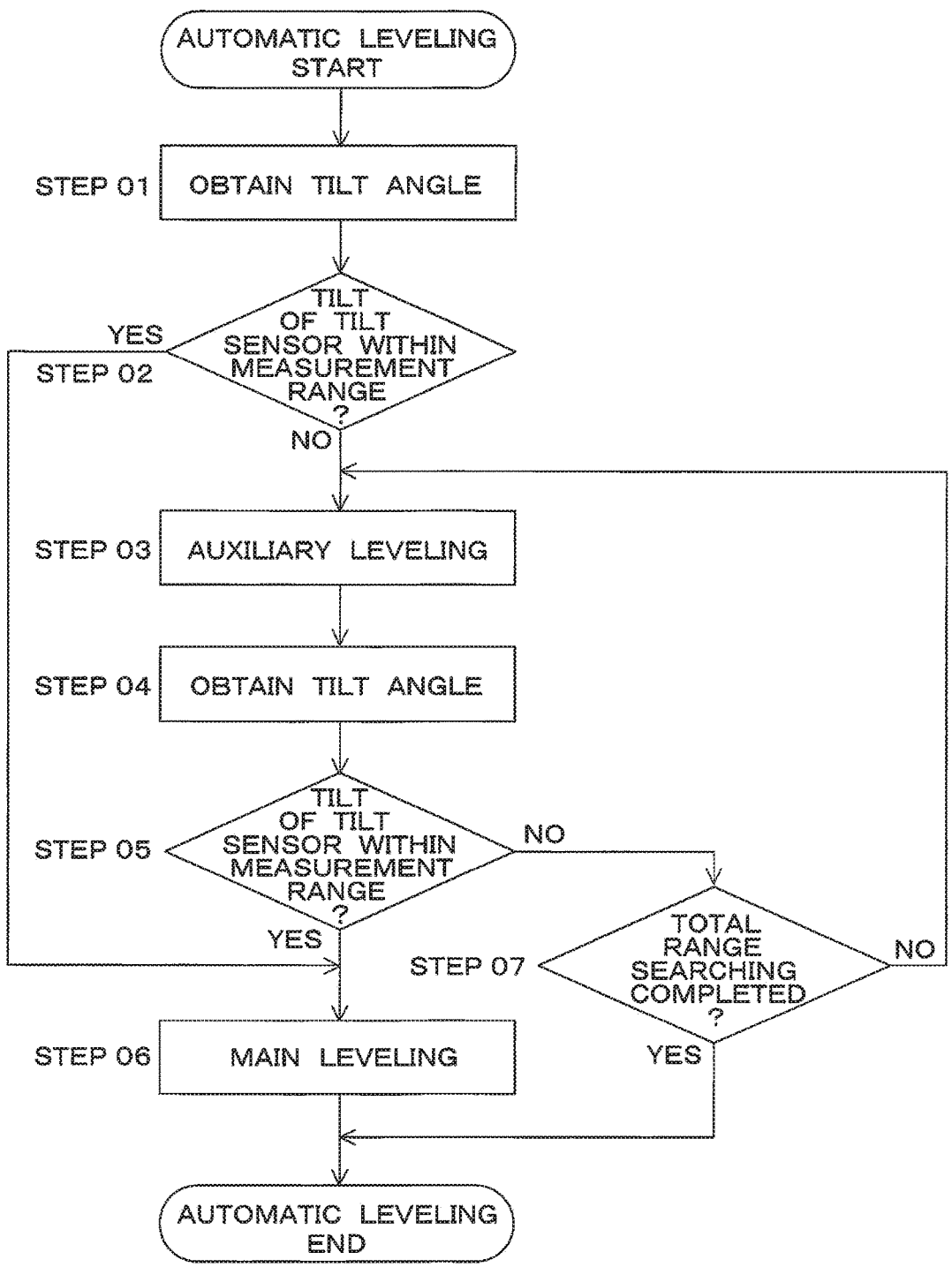
FIG. 5 is a flowchart to show a leveling operation of the present embodiment.

By referring to FIG. 5, further description will be given below on the leveling operation of the present embodiment.

The automatic leveling device 1 is installed at a predetermined position and the automatic leveling is instructed from the operation unit 26.

(Step 01 and Step 02) The tilt angle is obtained from the tilt sensor 19 and depending on the fact that tilt angle has been obtained or not, it is judged as to whether or not the tilting of the leveling base plate 4 is within the detection range of the tilt sensor 19 under the condition of installation.

In a case where it is possible to detect the tilting from the tilt sensor 19, the leveling is shifted to Step 06, and the main leveling is performed based on the detection result of the tilt sensor 19.

(Step 03) In a case where the tilting cannot be detected by the tilt sensor 19, the auxiliary leveling is carried out. In the auxiliary leveling, by regarding the absolute position as stored in the storage unit 23 as a starting point, the leveling base plate 4 is tilted till the tilt angle of the leveling base plate 4 reaches the searching route 33a, and further, the tilting of the leveling base plate 4 is changed along the searching route 33a. The auxiliary leveling is an operation for searching the sensor detection range 31.

(Step 04 and Step 05) When the detecting signal from the tilt sensor 19 is obtained in the process of searching, it is judged that the tilting of the leveling base plate 4 has become within the detection range of the tilt sensor 19 and the auxiliary leveling is completed.

(Step 06) Based on the detection result of the tilt sensor 19, the main leveling is executed.

(Step 07) In a case where the signal from the tilt sensor 19 is not obtained in the process of the auxiliary leveling and the searching of a total circumference of the searching route 33a is completed and the signal cannot be obtained, it is a case where the tilting amount at the time of the installation of the automatic leveling device 1 exceeds the range of the leveling operation. In such case, it is judged that the leveling is impossible, inability of the leveling is displayed on the display unit 27 or an alarm is issued from the display unit 27 and it is informed to the operator that the automatic leveling could not be performed.

The operator can carry out the operations as required such as re-installation of the automatic leveling device 1 and the like.

It is to be noted that the automatic leveling device as described above has one fixed shaft and two driving shafts and although the leveling is performed by displacing the two driving shafts, it is needless to say that the leveling can be performed by an automatic leveling device using other leveling mechanisms such as an automatic leveling device which has one fixed shaft and three driving shafts which displaces the three driving shafts.

Further, it is not necessary that the searching route 33a is identical to the driving limit 33 and it would suffice if it is so arranged that the sensor detection range 31 can be detected.

The invention claimed is:

1. An automatic leveling method in an automatic leveling device having only one tilt sensor provided on a leveling base plate, comprising: an auxiliary leveling step and a main leveling step, wherein said auxiliary leveling step entails changing an inclination of said leveling base plate following a predetermined searching route that is defined by successive inclinations, so as to bring said leveling base plate from a condition in which no tilt detecting signal reflecting said tilt sensor's inclination is obtained from said tilt sensor into a condition in which a tilt detecting signal reflecting said tilt sensor's inclination is obtained from said tilt sensor, and wherein said main leveling step entails leveling said leveling base plate horizontally based on the tilt detecting signal from said tilt sensor.

2. The automatic leveling method according to claim 1, wherein said auxiliary leveling step changes the tilting of said leveling base plate according to a driving limit as set to leave a predetermined surplus with respect to a maximum leveling range of said automatic leveling device.

3. The automatic leveling method according to claim 1, wherein said automatic leveling device has a leveling result as obtained when said leveling base plate was previously leveled horizontally, as an absolute position, and said auxiliary leveling step is started from said absolute position.

4. The automatic leveling method according to claim 3, wherein the leveling result is obtained every time an automatic leveling is executed, and said absolute position is updated based on said leveling result.

5. An automatic leveling device comprising: only one tilt sensor provided on a leveling base plate, a leveling mechanism unit capable of tilting said leveling base plate in at least two directions and a control device for controlling said leveling mechanism unit and for tilting said leveling base plate in a condition as required, wherein said control device is configured to carry out, by controlling said leveling mechanism unit, an auxiliary leveling step that entails changing an inclination of said leveling base plate following a predetermined searching route that is defined by successive inclinations, so as to bring said leveling base plate from a condition in which no tilt detecting signal reflecting said tilt sensor's inclination is obtained from said tilt sensor into a condition in which a tilt detecting signal reflecting said tilt sensor's inclination is obtained from said tilt sensor, and a subsequent main leveling step that entails leveling said leveling baseplate horizontally based on the tilt detecting signal from said tilt sensor.

6. The automatic leveling device according to claim 5, wherein said control device carries out said auxiliary leveling step that entails changing an inclination of said leveling base plate following a predetermined searching route that is defined by successive inclinations, so as to bring said leveling base plate from a condition in which no tilt detecting signal reflecting said tilt sensor's inclination is obtained from said tilt sensor into a condition in which a tilt detecting signal reflecting said tilt sensor's inclination is obtained from said tilt sensor, according to a driving limit as set to leave a predetermined surplus with respect to a maximum leveling range of said leveling mechanism unit.

7. An automatic leveling device according to claim 5, wherein said control device stores leveling results as obtained, when said leveling base plate was previously leveled horizontally, as an absolute position, and said auxiliary leveling step is started from said absolute position.

8. The automatic leveling device according to claim 7, wherein said control device obtains leveling results every time an automatic leveling is carried out and updates said absolute position based on said leveling results.

9. The automatic leveling device according to claim 5, wherein said leveling mechanism unit comprises limit sensors for detecting a tilting limit and wherein said control device stores a position of said leveling base plate, when said limit sensors detect a tilting limit, as an absolute position, and said auxiliary leveling step is started from said absolute position.

10. The automatic leveling device according to claim 9, wherein said control device obtains leveling results every time an automatic leveling is carried out and updates said absolute position based on said leveling results.

* * * * *